Feb. 12, 1952     H. A. SHERWOOD     2,585,178
MILKER CLAW
Filed July 24, 1950
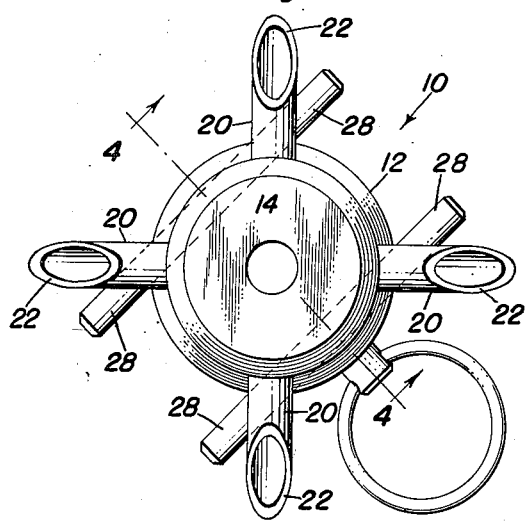
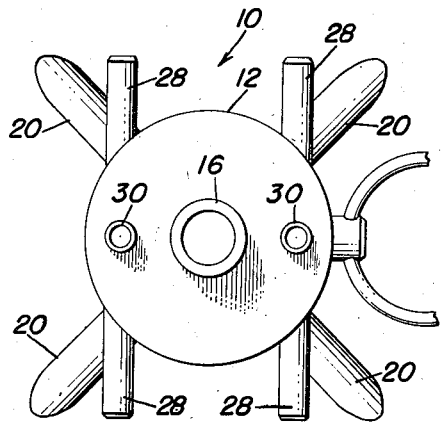
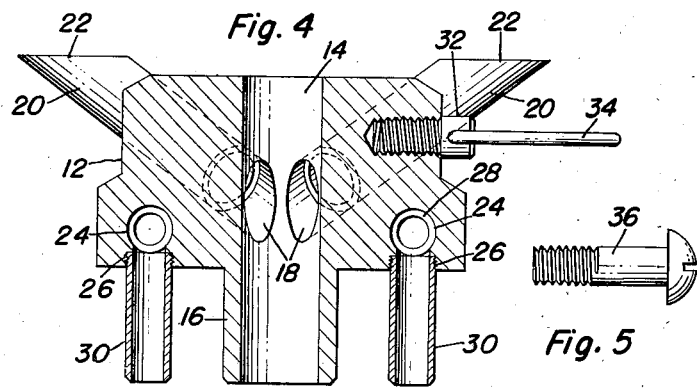
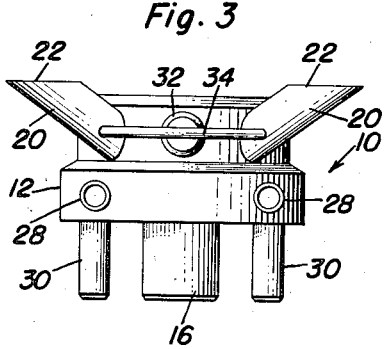
Henry A. Sherwood
INVENTOR.

Patented Feb. 12, 1952

2,585,178

UNITED STATES PATENT OFFICE 2,585,178

MILKER CLAW

Henry A. Sherwood, Harrah, Wash., assignor of one-half to Harold Ransier, Harrah, Wash.

Application July 24, 1950, Serial No. 175,555

1 Claim. (Cl. 119—14.54)

This invention relates to new and useful improvements and structural refinements in claws for milking machines, and the principal object of the invention is to provide a properly balanced claw which will distribute its weight evenly on the four teat cups of the machine and which will eliminate twisting of the flexible air and milk hoses.

Some of the advantages of the invention reside in its simplicity of construction, in its efficient operation, and in its adaptability to easy and convenient cleaning.

With the above more important objects and features in view, and such other objects and features as may become apparent as this specification proceeds, the invention consists essentially of the arrangement and construction of parts as illustrated in the accompanying drawings, in which:

Figure 1 is a top plan view of the invention;

Figure 2 is an underside plan view thereof;

Figure 3 is a side elevational view of the same;

Figure 4 is a vertical sectional view, taken substantially in the plane of the line 4—4 in Figure 1; and Figure 5 is an elevational view of a screw which may be used as an alternative hanger for the claw.

Like characters of reference are employed to designate like parts in the specification and throughout the several views.

Referring now to the accompanying drawings in detail, the invention consists of a milker claw which is designated generally by the reference character 10 and embodies in its construction a substantially cylindrical body 12 having a vertical axis and provided with an axial milk passage 14, the upper end of which may be closed by a suitable plug (not shown), while a delivery nipple 16 is provided centrally at the bottom of the body 12 and constitutes a downward continuation of the passage 14, as is best shown in Figure 4. The nipple 16 is adapted to have connected thereto a milk delivery hose (not shown) leading to a suitable milk receptacle.

The body 12 is also provided with four upwardly and outwardly extending bores 18 which communicate at their inner ends with the passage 14 and have axes disposed in the plane of the lateral surface of an inverted cone which is coaxial with the passage, and four milk tubes 20 are secured in the respective bores 18 and project upwardly and outwardly from the body 12, as shown. The upper ends of the tubes 20 may be beveled as indicated at 22, to facilitate connection thereof to milk conveying hoses extending from the teat cups.

The body 12 is also provided with two T-shaped air passages which are disposed below the bores 18 and at the opposite sides of the milk passage 14, these passages having coplanar horizontal arms 24 which are open at the ends thereof, and vertical arms 26 which communicate with intermediate portions of the horizontal arms, as illustrated in Figure 4. Tubular air hose receiving adapters 28 are screw threaded in the end portions of the horizontal arms 24 of the T-shaped passages, these adapters being used for connecting the claw by flexible hoses to the teat cups. Similarly, tubular adapters 30 are screw threaded into the vertical arms 26 of the T-shaped passages for connection by flexible hoses to the pulsator of the milking machine.

A hanger 32 projects laterally from the body 12 and is provided with an eye 34 for supporting the claw in any conventional manner, or alternatively, a simple screw may be substituted for the hanger means 32, 34, as indicated at 36 in Figure 5.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A milker claw, comprising a substantially cylindrical body having a vertical axis and provided with an axial milk passage, a delivery nipple provided centrally at the bottom of said body and constituting a downward continuation of said passage, said body being provided with four upwardly and outwardly extending bores communicating at their inner ends with said passage and having axes disposed in the plane of the lateral surface of an inverted cone which is coaxial with the passage, a set of four milk tubes secured in the respective bores of said body and projecting outwardly therefrom for connection to milk conveying hoses, said body also being provided with two T-shaped air passages disposed below said bores and at the opposite sides of said milk passage, said air passages having coplanar horizontal arms open at the ends thereof and vertical arms communicating with intermediate positions of the horizontal arms, and tubular air hose receiving adapters secured in and projecting outwardly from the end portions of the horizontal and vertical arms of said air passages.

HENRY A. SHERWOOD.

REFERENCES CITED

The following references are of record in the file of this patent:

UNITED STATES PATENTS

| Number | Name | Date |
|---|---|---|
| 1,538,735 | Oden | May 19, 1925 |
| 2,136,956 | Schmitt | Nov. 15, 1938 |
| 2,290,239 | Hodsdon | July 21, 1942 |
| 2,507,969 | Gascoigne | May 16, 1950 |